United States Patent Office 3,388,425
Patented June 18, 1968

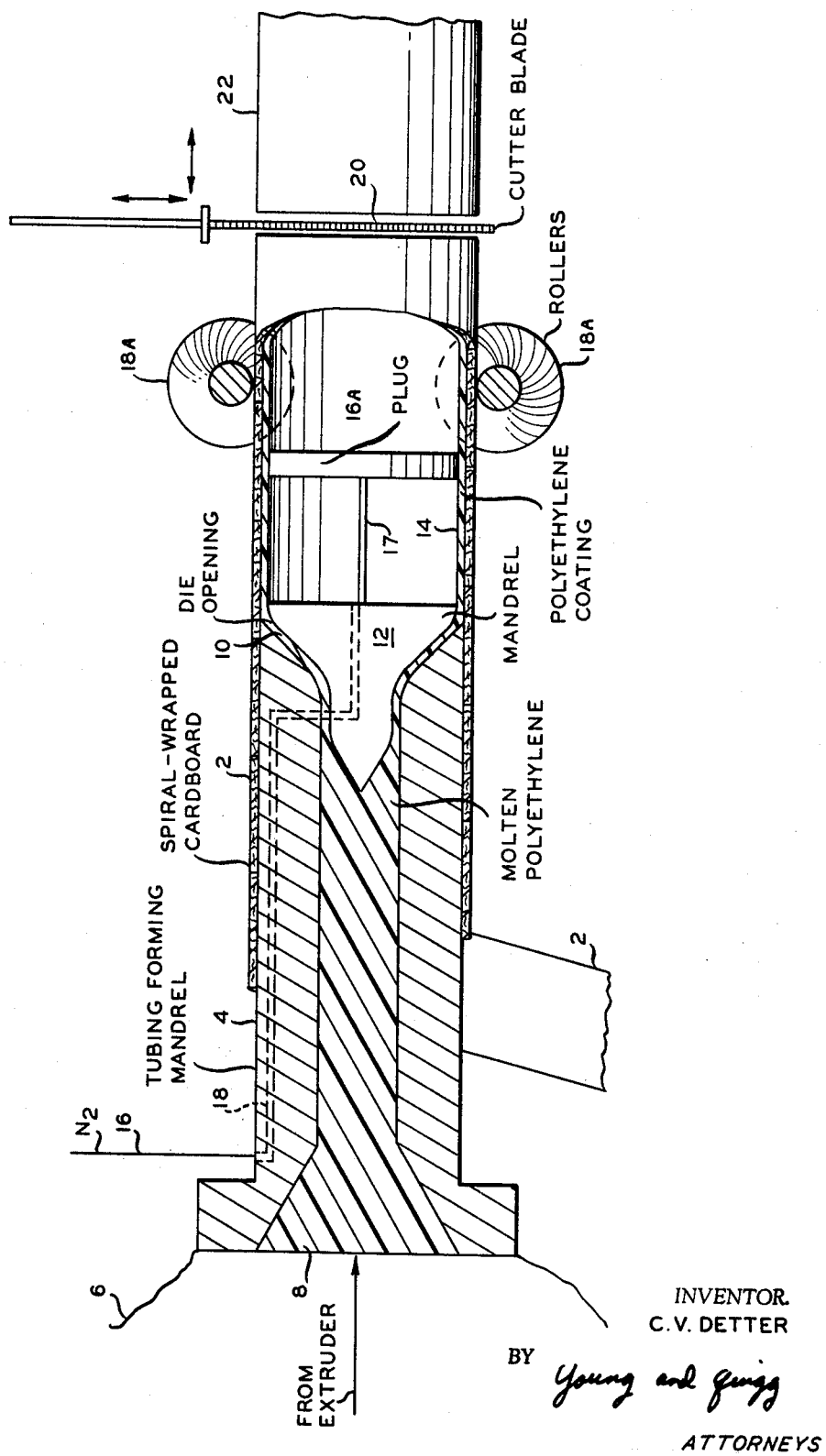

3,388,425
APPARATUS FOR COATING THE INTERIOR SURFACES OF HOLLOW SHAPED ARTICLES
Clyde V. Detter, Bartlesville, Okla., assignor to Phillips Petroleum Company, a corporation of Delaware
Filed Nov. 14, 1963, Ser. No. 323,754
1 Claim. (Cl. 18—13)

This invention relates to an apparatus for coating the interior surfaces of hollow shaped articles. In one aspect the invention relates to an apparatus for continuously applying a thermoplastic lining to an interior surface of a tubular article such as pipe, tubing, ducts, and the like.

Numerous methods have been employed for applying coatings to the interior walls of tubing, pipe, barrels, and the like. Many of these methods involve dipping in polymer solutions or the application of hot melt sprays which product adherent coatings of resins, such as polyethylene.

Methods have also been proposed for applying a coating upon the interior surface of an article of generally tubular shape by injecting a gas into a bubble of molten thermoplastic material while the thermoplastic material is being extruded, said bubble being positioned within the article to be coated The article to be coated is placed into a position concentric with the annular die and moved within the direction of the flow of the thermoplastic material while extruding the thermoplastic material through the die and injecting the gas to form the bubble. Thus, the thermoplastic material is impressed against the surface to be coated and the impressing is continued until a coating is completed and the article has moved forward of said die. The thermoplastic extrudate is then severed between the die and the coated article.

A major limitation of the hereinbefore proposed methods for coating the interior surfaces of hollow shaped articles is that they are essentially discontinuous processes. For example, in the aforementioned process for coating the interior of a tube by blowing a bubble of plastic therein and moving the tubing forward of the die, it is necessary after each severance of the tubing to reform the bubble by again sealing the thermoplastic and again inserting a separate tube over the tube-forming mandrel or concentric to the annular die.

It is an object of the invention to provide an apparatus for the coating of the interior surfaces of hollow shaped articles.

It is another object to provide an apparatus for applying a lining to the interior surface of a tubular article.

Yet another object of the invention is to provide an apparatus for continuously lining the interior surface of a tubular shaped article with a thermoplastic material.

These and other objects of the invention will be readily apparent to those skilled in the art from the accompanying disclosure, drawing and appended claims.

These objects are broadly accomplished by inserting within the cavity formed in the plastic by the gas pressure a plug or float member having an exterior surface shaped to closely fit the interior surface of the article to be coated and axially positioned within the cavity downstream from said die so as to maintain contact between said plastic and the interior surface of said article.

In one embodiment the hollow shaped article is formed continuously concentrically to the annular die while the thus formed article is continuously moved forward from said die. In another embodiment the thus coated article is continuously subdivided downstream from the aforementioned plug.

The articles which may be lined by the process and apparatus of this invention are not limited to those having a round or circular cross section but include generally tubular articles of any cross-section shaped whatever, for example rectangular, elliptical, and the like.

Any suitable method for extruding a molten material capable of coating the interior surface of the article may be employed. The size of the die and the rate of forward motion of the article being coated are preferably such as to produce a molten film which, when in contact with the surface, has the thickness desired, for example 0.1 to 20 mils. However, a thickness as large as 100 mils may also be employed if desired. Any suitable mechanical device for producing the motion of the article which is to be coated may be employed, for example, driven pinch rolls suitably positioned.

When the surface to be coated is a metal advantageous results are achieved by heating the article to a temperature above the melting point of the thermoplastic coating but below the decomposition temperature thereof. The coating solidifies while being impressed against the surface by the pressure of the injected gas. If desired this solidification can be achieved by quenching the article as the coating is being applied thereto; for example, this can be done by applying a cooling fluid to the exterior surface of the article.

An important application of the process and apparatus of the invention is the coating of the interior of spiral wrapped cardboard which is subsequently subdivided to form tubes which, when ends are applied, are employed as containers, for example, containers for oil. While many of the important applications of the article to be coated are composed of metal or paper products, it is to be understood that the article may be composed of any other suitable mtaerials, such metals for example as copper, aluminum, etc., a fibrous or non-fibrous cellulosic material (cardboard, vulcanized fibers, cellophane, etc.). The coating material is any thermoplastic material which will adhere to the article such as a polyamide, a relatively high melting or non-melting synthetic resin, such as polymers of 1-olefins, especially polypropylene and polyethylene, copolymers of ethylene and its higher homologues, such as a copolymer of ethylene and butene-1, and other suitably cured polyolefins. Particularly suitable polymers are described in the patent to J. P. Hogan and R. L. Banks, U.S. Patent No. 2,825,721.

The invention is further illustrated by means of the accompanying drawing, which is a cross-sectional view of a suitable arrangement of equipment of the process and apparatus herein disclosed.

The invention is herein described for purposes of simplicity with reference to the lining of a spiral wrapped cardboard container with molten polyethylene. The cardboard 2 is spiral wrapped on a tube-forming mandrel 4 attached to an extruder 6 (not shown). The cardboard is slidably positioned over the tube-forming mandrel 4 with the molten thermoplastic material being contained in passageway 8. The cardboard tubing is concentric with the annular die opening 10 and mandrel 12. The molten polyethylene is moved through the passageway 8 by the action of the extruder 6 and thence through the annular die opening 10. Suitable pressure gauges and thermocouples may be provided. Any suitable means such as spacers or an air slide (not shown) may be provided for separating the cardboard tube from the tube-forming mandrel 4 and maintaining a good sliding surface. The extrudate 14 is released through the annular die 10 in the form of a hollow tube. Air or any suitable inert gas, such as nitrogen, is introduced through conduit 16 and passageway 18 positioned lengthwise along the tube-forming mandrel 4 and directed to the central portion of the annular die or mandrel 12. This passageway communicates with the bubble formed by the extrudate 14. The extrudate 14 is impressed against the inner wall of the cardboard tubing 2 by the pressure of the injected gas. The thickness of the lining is controlled by the ratio of the extrusion rate and the rate of take-off of the lined pipe, the motion of which tends to draw the extrudate away from the die.

Conventionally the extrudate is pinched to form a bubble which must be reformed after each severance of the tubing. By the method and apparatus of this invention a plug or float member 16A is positioned within the hollow thermoplastic formed by the gas and shaped so as to closely fit the interior surface of the coated tubing. The plug is attached by a member 17, such as a cable or an elongated flexible member or slidably mounted support, to the mandrel 12. Thus, once the cavity has been formed the plug prevents the passage of any substantial portion of the gas from the area immediately downstream of the annular die. The tubing is continuously removed from the tube-forming mandrel 4 as it is formed by take-off rollers 18A. If and when desired, the tubing is severed or subdivided by any suitable means such as a cutter blade 20 positioned downstream of the plug and pulling means. The cutter blade is actuated both laterally and vertically so as to provide substantially identical units of the coated cardboard tubing to subsequently form containers from units 22.

While the invention has been described with reference to particular method steps and apparatus elements, the invention is not so limited. Various modifications can be performed within the scope of the invention.

I claim:

1. Apparatus for continuously lining the interior surface of an elongated tubular article of cardboard, metal, and the like, with a thermoplastic material and cutting the thus-lined tubular article into lengths suitable for making containers comprising:

(a) an extruder;

(b) a tube forming mandrel positioned at the discharge terminus of said extruder, said mandrel having an axial passageway and a die head with an annular opening through which thermoplastic material is extruded in the form of a hollow tube;

(c) means for spirally wrapping cardboard, metal and the like around and in slidable relationship with said mandrel to form a tubular article concentric with said annular die opening and said hollow tube of extruded thermoplastic material;

(d) roller means for continuously moving said tubular article concentric with and in the direction of flow of the extruded thermoplastic material;

(e) conduit means disposed in said mandrel in communication with an opening through said die head for introducing a pressurized, inert gas into the interior of said hollow tube of extruded thermoplastic material to impress said thermoplastic material against the interior surfaces of said tubular article thereby forming a lining for said tubular article;

(f) a circular plug member attached to said die head by a flexible, elongated member and axially positioned downstream of said die head within said hollow tubular extruded material, said plug member being shaped to closely fit the interior surface of the lined tubular article so as to prevent the passage of any substantial portion of said gas thereby; and (g) cutting means located downstream of said plug member for continuously cutting the lined tubular article into desired lengths for containers.

References Cited

UNITED STATES PATENTS

| | | | |
|---|---|---|---|
| 1,988,628 | 1/1935 | McDonald et al. | 264—173 X |
| 2,309,903 | 2/1943 | Hume | 264—209 X |
| 2,335,978 | 12/1943 | Vogt | 264—94 X |
| 2,724,672 | 11/1955 | Rubin | 264—94 X |
| 2,948,919 | 8/1960 | Matthews | 264—95 X |
| 2,958,364 | 11/1960 | Thompson | 264—94 X |
| 2,966,700 | 1/1961 | Dyer et al. | 264—95 |
| 3,248,463 | 5/1966 | Wiley et al. | 264—209 |
| 3,249,670 | 5/1966 | Rottner et al. | 264—209 |
| 3,284,552 | 11/1966 | Haley | 264—209 X |

FOREIGN PATENTS

| | | |
|---|---|---|
| 883,562 | 11/1961 | Great Britain. |

ROBERT F. WHITE, *Primary Examiner.*

L. S. SQUIRES, T. J. CARVIS, *Assistant Examiners.*